United States Patent
Hsu et al.

(10) Patent No.: US 6,757,273 B1
(45) Date of Patent: Jun. 29, 2004

(54) APPARATUS, AND ASSOCIATED METHOD, FOR COMMUNICATING STREAMING VIDEO IN A RADIO COMMUNICATION SYSTEM

(75) Inventors: Liangchi Hsu, Arlington, TX (US); Federico Fraccaroli, Irving, TX (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/498,683

(22) Filed: Feb. 7, 2000

(51) Int. Cl.[7] ................................................. H04J 3/24
(52) U.S. Cl. ...................... 370/349; 370/231; 370/235; 370/236; 370/412; 455/453
(58) Field of Search ............................. 370/230.1, 231, 370/236, 349, 395.21, 395.71, 395.7, 328, 329, 338, 412, 410, 468, 229, 230, 235; 455/453

(56) References Cited

U.S. PATENT DOCUMENTS

| | | | | |
|---|---|---|---|---|
| 5,764,625 A | * | 6/1998 | Bournas ...................... | 370/231 |
| 5,805,822 A | * | 9/1998 | Long et al. .................. | 709/232 |
| 5,828,664 A | * | 10/1998 | Weir ........................... | 370/375 |
| 5,930,233 A | * | 7/1999 | Kanerva et al. ............. | 370/231 |
| 5,974,028 A | * | 10/1999 | Ramakrishnan ............. | 370/229 |
| 6,118,834 A | * | 9/2000 | Rasanen ...................... | 375/372 |
| 6,188,700 B1 | * | 2/2001 | Kato et al. ................... | 370/477 |
| 6,298,041 B1 | * | 10/2001 | Packer ........................ | 370/231 |
| 6,360,271 B1 | * | 3/2002 | Schuster et al. ............. | 709/231 |
| 6,415,410 B1 | * | 7/2002 | Kanerva et al. ............. | 714/749 |
| 6,452,950 B1 | * | 9/2002 | Ohlsson et al. ............. | 370/516 |
| 6,473,798 B1 | * | 10/2002 | Grosser et al. ............. | 709/224 |
| 6,516,002 B1 | * | 2/2003 | Huang et al. ................ | 370/468 |

FOREIGN PATENT DOCUMENTS

| WO | WO 95/31878 | * 11/1995 | ............ H04Q/7/22 |
|---|---|---|---|

OTHER PUBLICATIONS

Stevens, Richard W., "TCP/IP Illustrated, vol. 1", 1994, Addison Wesley, chapter 20, pp. 275–296.*
Grosslauser, Matthias et al., "RCBR: A Simple and Efficient Service for Multiple Time–Scale Traffic", 1997, IEEE/ACM Transactions on Networking.*
Stevens, Richard W., "TCP/IP Illustrated, vol. 1", 1994, Addison Wesley, Section 17.3, pp. 225–227.*

* cited by examiner

Primary Examiner—Alpus H. Hsu
Assistant Examiner—Michael J Molinari (57) ABSTRACT

Apparatus, and an associated method, for facilitating bandwidth smoothing to effectuate a communication service including the communication of streaming video or other multimedia data component in a radio communication system, such as a cellular communication system. A mobile station includes a buffer at which to buffer the streaming multimedia data component when received at the mobile station. An indication of the size of the buffer is utilized in the selection of the bandwidth smoothing.

13 Claims, 6 Drawing Sheets

APPARATUS, AND ASSOCIATED METHOD, FOR COMMUNICATING STREAMING VIDEO IN A RADIO COMMUNICATION SYSTEM

The present invention relates generally to a bandwidth smoothing scheme for streaming video to a streaming client. More particularly, the present invention relates to apparatus, and an associated method, by which to facilitate the communication of streaming video to a mobile station in a radio communication system. An indication of the buffer size of a buffer at the mobile station at which the streaming video is buffered is utilized in bandwidth smoothing operations. Changes in bandwidth allocations pursuant to the bandwidth smoothing operations are made, as necessary, if the time required to renegotiate the changes in the bandwidth allocations in the radio communication are less than the time during which the bandwidth allocation is to be changed.

BACKGROUND OF THE INVENTION

Advancements in communication technologies have permitted the introduction of, and popularization of, new types of, and improvements in existing, communication systems. Increasingly large amounts of data are permitted to be communicated at increasingly-high throughput rates through the use of such new, or improved, communication systems. As a result of such improvements, new types of communications, requiring high data throughput rates, are possible. Digital communication techniques, for instance, are increasingly utilized in communication systems to efficiently communicate digital data, and the use of such techniques has facilitated the increased data throughput rates.

Multimedia communications, for instance, are exemplary of new types of communications permitted as a result of the improvements in communication technologies. Multimedia communications refer, generally, to the communication of more than one type of data between a sending station and a receiving station. Typically, the communication of such more than one type of data appears, to a user, to be simultaneous. Multimedia communications include, for instance, voice-over-IP (Internet protocol) applications. Audio signals overlayed upon video signals used to effectuate teleconferencing is an example of a multimedia communication application. Two-way whiteboard communication is exemplary of another multimedia communication application. Various of such multimedia communications utilize streaming multimedia, such as streaming video.

Streaming video or other multimedia data is generated by a streaming proxy and is provided to a streaming client. Streaming multimedia is provided by way of, for example, the Internet. In such an application, the streaming proxy is formed, for instance, of a computer server connected to the Internet, and the streaming client is formed of, for example, a personal computer, or the like. In a streaming video application, downloading, decoding, and playing of the data is performed simultaneously. That is to say, as the streaming video is downloaded, streaming video previously downloaded is decoded, and streaming video previously downloaded and decoded, is played, in an on-line basis.

When the streaming client is formed of a personal computer, or the like, the storage capacity of the streaming client is generally large and is usually not a limiting factor in effectuation of communication of the streaming video. Storage capacity is required at the streaming client to buffer data as the data is received from the streaming proxy.

Additional advancements in communication technologies have permitted the introduction, and widespread usage, of radio communication systems, such as cellular communication systems. A mobile station operable in a cellular, or other, radio, communication system is capable of transceiving data with network infrastructure of the radio communication system by way of a radio link. Existing radio communication systems permit the communication of both and voice and non-voice data.

Proposals have been set forth to provide for multimedia communication, including the communication of streaming multimedia data, to a mobile station. Generally, however, in both wireline and non-wireline applications, the bandwidth, i.e., the bit rate, required to transmit the streaming video is variable. Such variation in the required bandwidth results from compression of the data prior to its transmission. In a radio communication system, such as a cellular communication system, radio resource management is required to allocate the appropriate amount of bandwidth to insure the successful communication of the streaming video. Schemes have been set forth for wireline communication systems by which to deal with the variability of the bandwidth requirements. Caching schemes, sometimes also referred to as buffering or pre-fetching schemes, and bandwidth smoothing schemes are exemplary of such schemes. However, existing implementations of such schemes are generally too inflexible for application to cellular, or other radio, communication systems.

While, and as noted above, the streaming client in a typical wireline implementation includes a fairly large storage capacity at which streaming video can be buffered, when a mobile station forms the streaming client, the memory capacity of the client cannot be assumed to be of the fairly large storage capacity. If the storage capacity of the mobile station is small, the bandwidth of the streaming video must be appropriately altered to insure that buffer overflow does not interfere with communication of the streaming video. Also, because radio resources are limited in a radio communication system, efficient allocation of the radio resources is required to permit efficient operation of the radio communication system. Existing schemes which deal with bandwidth variability of communication of streaming video do not generally take into account the unique need to manage radio resources required in a radio communication system.

If a manner could be provided by which better to facilitate communication of streaming video in a radio communication system, improved communication of streaming video in a radio communication system, would be permitted.

It is in light of this background information related to the communication of streaming video that the improvements of the present invention have evolved.

SUMMARY OF THE INVENTION

The present invention, accordingly, advantageously provides apparatus, and an associated method, for facilitating the communication of streaming video in a radio communication system to a streaming client, such as a mobile station operable in a cellular communication system.

During operation of an embodiment of the present invention, bandwidth smoothing is performed to facilitate the communication of the streaming video or another multimedia data component to the mobile station. Determination of a bandwidth plan to allocate the bandwidth for the communication of the streaming video to the mobile station is dynamically determined in manners to take into account characteristics of the mobile station.

In one aspect of the present invention, the mobile station includes a buffer at which streaming video is buffered during performance of a communication service in which streaming video is provided to the mobile station. The buffer size of the buffer available for buffering of the streaming video is determined, and an indication of such buffer size is utilized in bandwidth smoothing operations. That is to say, allocations of bandwidth for which to effectuate the communication of the streaming video is dependent, in part, upon the size of the buffer available at the mobile station to buffer the streaming video. The characteristics of the streaming video, such as the number of accumulated bits per frame of the streaming video as a function of a frame number of the streaming video, is also utilized in the allocation of bandwidth to effectuate the communication of the streaming video.

In another aspect of the present, a determination is made at the mobile station of the size of the buffer available to buffer the streaming video to be provided thereto pursuant to a communication service. The buffer size is, for instance, a set size of a memory element dedicated to buffer the streaming video. Or, the buffer size is selectably allocable. That is to say, a portion of a memory element of the mobile station is available for use as a buffer to buffer the steaming data provided to the mobile station pursuant to the performance of a communication service. The portion of the memory element allocable to form a buffer to buffer the streaming video is alterable, dependent, for instance, upon the need to allocate portions of the memory element for other operations. In an implementation in which the buffer size is a set value, determination of the buffer size necessitates merely retrieval of a value representative of the buffer size. When the buffer is selectable, the determination of the buffer size necessitates dynamic inquiry of the selected buffer size, such as prior to initiation of the performance of the communication service.

In another aspect of the present invention, subsequent to determination of the buffer size of the buffer available to buffer the streaming video, a buffer-size indication message is generated at the mobile station for communication over a radio link to network infrastructure with which the mobile station is operable, thereby to identify to the network infrastructure the buffer size of the buffer available at the mobile station to buffer the streaming video. Such indication is utilized in the allocation of the bandwidth to the communication service to effectuate the communication of the streaming video. In one implementation, the buffer-size indication message forms a portion of a request for the performance of a communication service which includes the downloading thereto of streaming video.

In one implementation, the mobile station includes a buffer-size indication message generator coupled to receive indications of determinations of the buffer size available at the mobile station to buffer the streaming video. The buffer-size indication message generator is further coupled to a transmit portion of the mobile station. The bandwidth-size indication message generator is operable to generate a buffer-size indication message of a value indicative of the buffer size of the buffer available at the mobile station to buffer the steaming data. The transmit portion of the mobile station converts the signal into a form to permit its communication upon a radio link to the network infrastructure. In an implementation in which the buffer-size indication message forms a portion of the request for the performance of a communication service, the buffer-size indication message is formatted by a formatter into such a request.

In another implementation, the network infrastructure includes a bandwidth smoothing scheme selector. The bandwidth smoothing scheme selector is coupled to receive indications of the buffer-size indication message. In the exemplary implementation, the bandwidth smoothing scheme selector is further coupled to receive indicia of the streaming video, such as the number of accumulated bits per frame. Responsive to such information, the bandwidth smoothing scheme selector selects the allocation of bandwidth for the communication of the streaming video. Such selection takes into account the required bandwidth to effectuate the communication of the streaming video as well as the size of the buffer located at the mobile station available to buffer the streaming video when received thereat.

In a further implementation, when alteration in the bandwidth allocated to effectuate the communication of the streaming video pursuant to a communication service necessitates reallocation of radio resources, a radio resource manager is informed of the need to increase, or decrease, the allocation of the bandwidth over the radio link, thereby to permit such reallocation to be effectuated. In one implementation, the bandwidth smoothing scheme selector forms a portion of a streaming proxy at which the streaming video originates. In another implementation, the bandwidth smoothing scheme selector forms a portion of the base station system (BSS) of the network infrastructure.

In an exemplary implementation, an embodiment of the present invention is operable in a cellular communication system, such as a CDMA (code-division, multiple-access)-based or a TDMA (time-division, multiple access)-based system. The mobile station operable in such a cellular communication system is of any of various types of construction and includes radio transceiver circuitry operable to transceive communication signals generated upon a radio link defined in the cellular communication system. The mobile station, for instance, is comprised of a conventional mobile terminal having a relatively small buffer allocated to buffer streaming video. The mobile station can alternately be formed of a Nokia-communicator (TM)-type mobile station. And, the mobile station can also be formed of a mobile terminal coupled to a personal computer, or the like. The various types of mobile stations each exhibit different buffers of different buffer sizes. Through operation of an embodiment of the present invention, indications of the buffer size are determined and utilized to form a buffer-size indication message. The message is communicated to a bandwidth smoothing scheme selector, located at the network infrastructure of the cellular communication system. In one implementation, the bandwidth smoothing scheme selector forms a portion of the base station system of the network infrastructure. In another implementation, the bandwidth smoothing scheme selector forms a portion of a streaming proxy at which the streaming video is originated. Bandwidth allocations for the communication of the streaming video are selected responsive, in part, to the buffer size indicated in the buffer-size indication message.

In these and other aspects, therefore, apparatus, and an associated method, is provided for a mobile station operable in a radio communication system at least to receive a streaming multimedia data component by way of a radio link. The streaming multimedia data component is generated by a streaming multimedia data component source. The apparatus, and associated method, facilitates bandwidth smoothing allocations of bandwidth to communicate the streaming multimedia data component upon the radio link. A buffer of a selected buffer size is located at the mobile station. The buffer buffers the streaming video when received at the mobile station. A buffer-size message generator is coupled to receive indications of the selected buffer size of the buffer. The buffer-size message generator generates a buffer-size indication message for transmission upon the radio link. The buffer-size indication message indicates the selected buffer size of the buffer.

Further, in these and other aspects, apparatus and an associated method is provided for the network infrastructure of the radio communication system. The radio communication system includes both the network infrastructure and a mobile station at least operable to receive a streaming multimedia data component by way of a radio link formable therebetween. The streaming multimedia data component is generated by a streaming multimedia data component source. The apparatus, and associated method, facilitates bandwidth smoothing allocations of bandwidth to communicate the streaming multimedia data component upon the radio link. A bandwidth smoothing scheme selector is coupled to receive indications of the selected buffer size indicated by the buffer-size indication message generated by the buffer-size message generator. The bandwidth smoothing scheme selector selects the allocation of bandwidth for communication upon the radio link of the streaming multimedia data component responsive to values of the indications of the selected buffer size.

The present invention and the scope thereof can be obtained from the accompanying drawings which are briefly summarized below, the following detailed description of the presently-preferred embodiments of the invention, and the appended claims.

DETAILED DESCRIPTION OF THE PREFERRED EMBODIMENT

Figure 1:
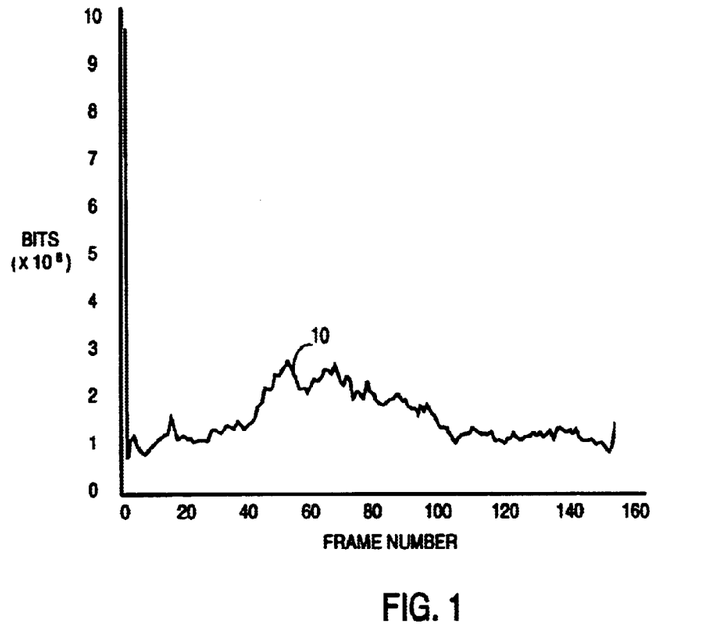
FIGS. 1 and 2 illustrate graphical representations representing the variability of bandwidth requirements of an exemplary sequence of streaming video.

Turning first to the graphical representation of FIG. 1, a plot, shown generally at 10, is formed by plotting the number of bits required to communicate a sequence of streaming video, formed of a plurality of frames. Other multimedia data components are similarly plotted. It should be noted, at the outset, that while the following description describes operation of an embodiment of the present invention with respect to the communication of streaming video, other types of multimedia data components can analogously be communicated through operation of an embodiment of the present invention. The plot 10 is formed by plotting the number of bits required to communicate, as a function of the frame number, the frames which together form the sequence of streaming video. Analysis of the plot 10 illustrates the variation of the number of bits required to communicate successive ones of the frames. When greater numbers of bits are required to communicate a frame of the streaming video, increased bandwidth allocations are required to effectuate the communication of the frame. And, when fewer numbers of bits are required to communicate the frame, a less than the bandwidth is required to effectuate the communication of the frame.

Figure 2:
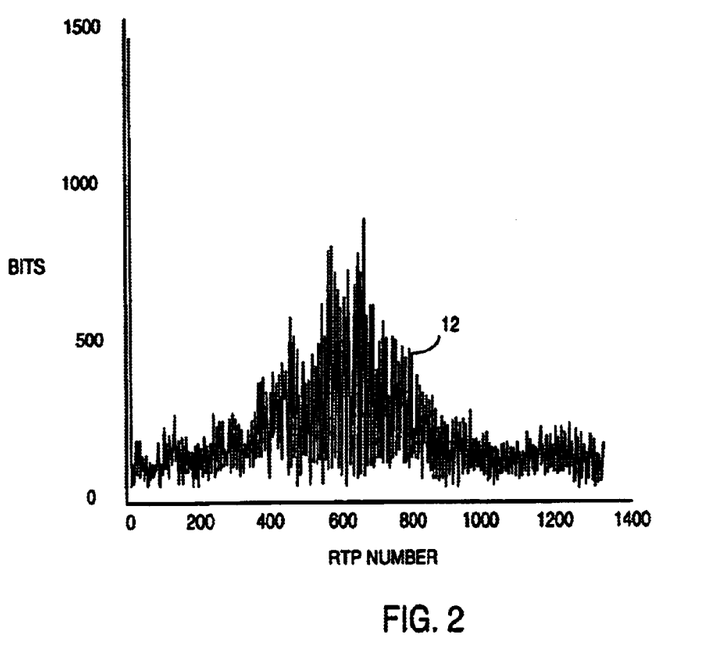

The graphical representation of FIG. 2 shows an analogous plot, here shown generally at 12, which also shows the variability of the number of bits, and corresponding variability of bandwidth, to effectuate communication of a sequence of streaming video. The plot 12 is formed by plotting the number of bits, as a function of RTP (real time protocol) packets into which the data forming the streaming video is formatted. Analysis of the plot 12 again shows the bit-variability, and hence, variability of bandwidth, in the communication of a sequence of streaming video.

The plot 10 shown in FIG. 1 is on a large-time scale, and the plot 12 is on a small-time scale.

Figure 3:
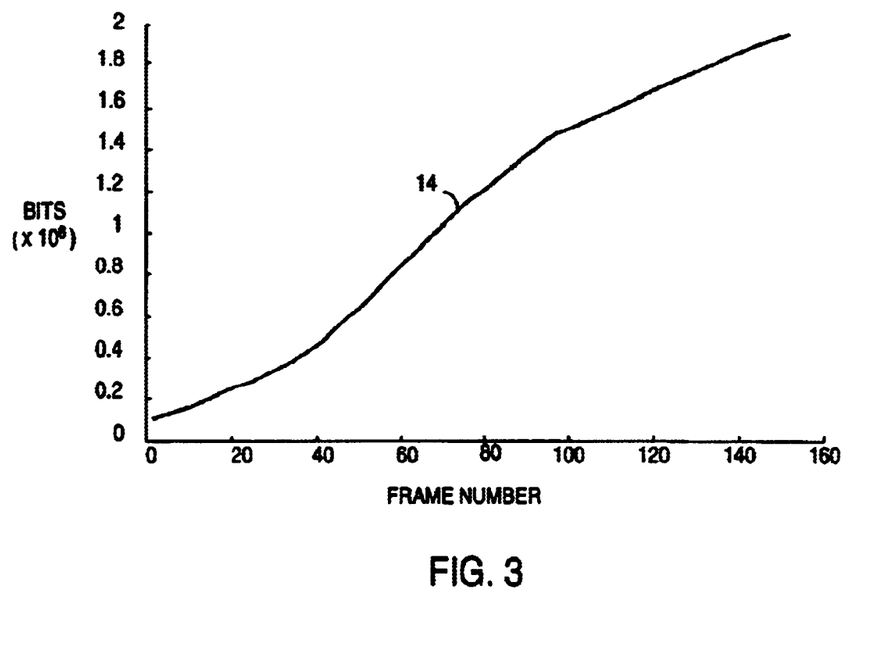
FIG. 3 illustrates a graphical representation showing the accumulated amount of data required to be communicated to effectuate the communication of an exemplary sequence of streaming video.

The graphical representation of FIG. 3 illustrates a plot, shown generally at 14, which shows the accumulated number of bits required to communicate the sequence of streaming video, plotted as a number of frames communicated to effectuate the communication of the streaming video. The plot 14 forms a monotonically-increasing function of which the tangent slope of each point of the plot defines an instantaneous required bandwidth in terms of bits/frame.

Because of the significant variability of bandwidth required to communicate a sequence of streaming video, various bandwidth-smoothing schemes have been proposed and implemented to facilitate the communication of streaming video. The general goal of bandwidth smoothing is to reduce the required bandwidth variation which would otherwise be required to effectuate the communication of the streaming video. As mentioned previously, communication of streaming video in conventional applications are effectuated by way of wireline, computer networks in which the streaming client to which the streaming video is provided is formed of a personal computer, or other device having a significant storage capacity. Such existing schemes, however, are not able to be implemented effectively in radio communication systems, such as cellular communication systems. For instance, the conventional assumption that the streaming client contains a storage element of large storage capacity is not necessarily appropriate in a radio communication system. Also, in a cellular, or other radio, communication system, bandwidth allocations over a radio link are made pursuant to service negotiations. When a change in bandwidth allocation is necessitated pursuant to a bandwidth-smoothing scheme, existing bandwidth-smoothing schemes do not generally provide for service renegotiations. Operation of an embodiment of the present invention takes into account the unique aspects of radio communication systems and the corresponding unique difficulties which must be overcome to permit the efficient communication of streaming video in a radio communication system.

Figure 4:
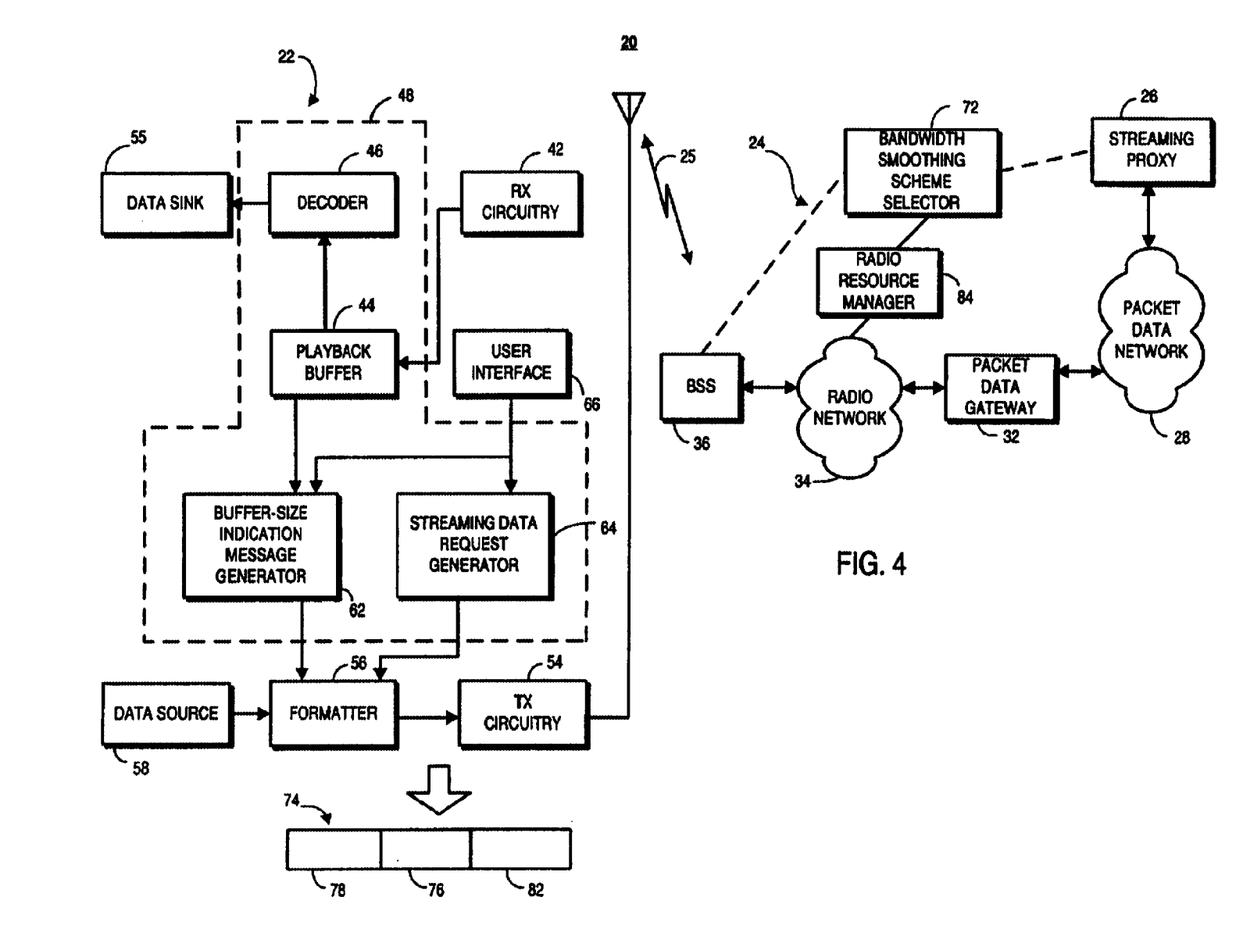
FIG. 4 illustrates a functional block diagram of a communication system in which an embodiment of the present invention is operable.

FIG. 4 illustrates a communication system, shown generally at 20, in which an embodiment of the present invention is operable. In the exemplary implementation shown in the Figure, the communication system 20 forms a cellular communication system. It should be understood, however, that an embodiment of the present invention is similarly also operable in other types of communication systems, both non-wireline and wireline in nature. Accordingly, operation of an embodiment of the present invention can analogously be described with respect to such other types of communication systems.

The communication system 20 is here shown to include a mobile station 22 operable to communicate with network infrastructure 24 by way of communication channels defined upon a radio link 25. The mobile station 22 is at least operable to receive streaming video, such as streaming video provided pursuant to performance of a multimedia service. Here, the streaming video is generated by a streaming proxy 26, formed, e.g., by a computer server, at which the streaming video is originated. The streaming video is communicated through a packet data network 28, a packet data gateway 32, a radio network 34, and a base station system (BSS) 36, and thereafter upon the radio link 26 to the mobile station 22.

The mobile station includes receive circuitry 42 operable to receive the streaming video. Streaming video is buffered at a playback buffer 44 which is coupled to the receive circuitry 42. Data buffered at the playback buffer 44 is decoded by a decoder 46, here forming a portion of control circuitry 48. Once decoded, the streaming video is provided to a data sink 52.

The mobile station also includes a transmit portion including transmit circuitry 54 operable to generate transmit signals for communication upon the radio link 25 to the network infrastructure 24. Here, the transmit circuitry is coupled to receive data format by a formatter 56. Data generated by a data source 58, for instance, is formatted by the formatter 56 prior to application to the transmit circuitry 54. Also, pursuant to an embodiment of the present invention, the formatter 56 is coupled to a buffer-size indication message generator 62 and to a streaming video request generator 64. Signals generated by the generators 62 and 64 are initiated, e.g., responsive to user actuation of a user actuator 66.

The buffer size indication message generated by the generator 62 is of a value representative of the size of the playback buffer 44. In one implementation, the playback buffer 44 is of a fixed size, in another implementation, the size of the buffer is selectable. In the implementation in which the size of the buffer 44 is fixed, the buffer size indication message generated by the generator 62 is of a constant value. And, in the implementation in which the size of the buffer 44 is selectable, the value of the buffer size indication message is of a correspondingly selectable value. The message generated by the generator 62, when provided to the transmit circuitry 54, is converted into a form to permit its communication to the network infrastructure to indicate to the network infrastruture the buffer size of the playback buffer 44. When received at the network infrastructure, the buffer size indication message is provided to a bandwidth-smoothing scheme selector 72. In one implementation, the bandwidth-smoothing scheme selector 72 is located at the base station system 36, in another implementation, the bandwidth-smoothing scheme selector 72 forms a portion of the streaming proxy 26. Because the selector 72 is functional in nature, the selector is positionable at any location, or distributed amongst more than one location, of the network infrastructure. Indication of the value of the buffer size of the playback buffer is utilized during operation of an embodiment of the present invention to select the bandwidth-smoothing scheme, and the allocation of the bandwidth pursuant thereto, to facilitate communication of streaming video to the mobile station.

In one implementation, the buffer size indication message is provided to the network infrastructure pursuant to a request generated at the mobile station by the streaming video request generator 64 to download streaming video to the mobile station. In such an implementation, the formatter generates a formatted message 74, here including a request portion 76, the buffer size indication message 78, and an address portion 82, e.g., the address of the streaming proxy 26 at which, in one implementation, the bandwidth-smoothing scheme selector 72 is located.

The network infrastructure 26 is also shown to include a radio resource manager 84. The resource manager 84 is coupled to the selector 72 and is operable to negotiate the allocation of communication resources of the radio network to insure that adequate resources are available to effectuate the communication of the streaming video to be downloaded to the mobile station. During operation of an embodiment of the present invention, when the required level of bandwidth resources is altered, service renegotiation is effectuated by the resource manager.

Figure 5:
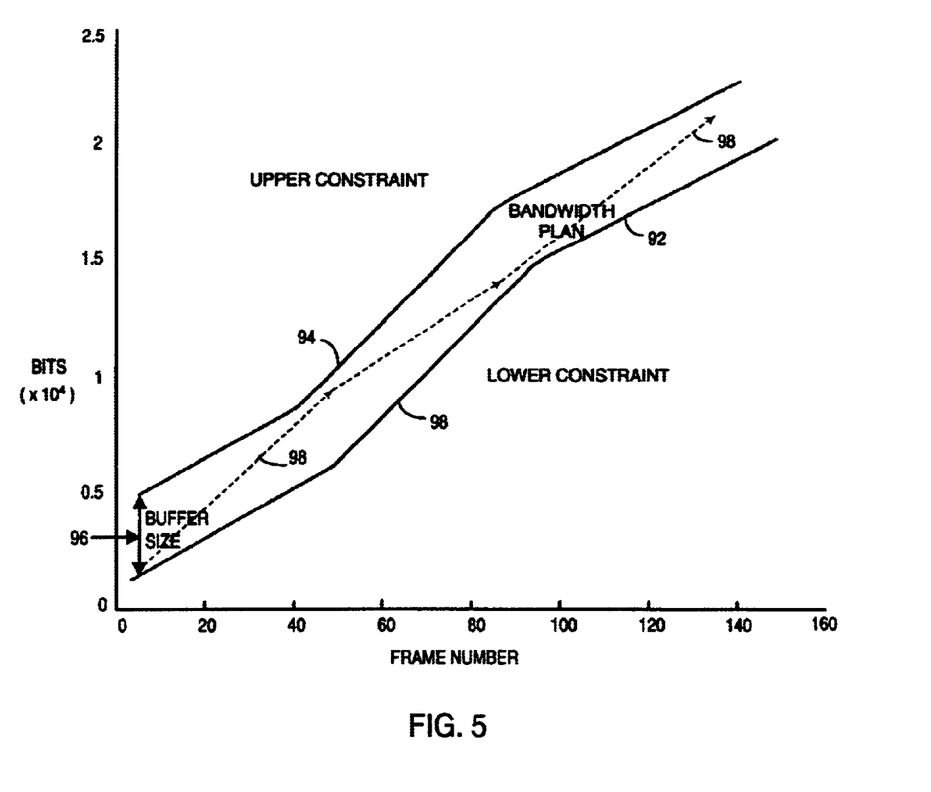
FIG. 5 illustrates a graphical representation of an exemplary bandwidth-smoothing scheme selected during operation of an embodiment of the present invention.

The graphical representation of FIG. 5 illustrates graphically operation of the bandwidth-smoothing scheme selector 72 of an embodiment of the present invention. The graphical representation includes a first plot 92 and a second plot 94, each of which define monotonically-increasing functions, analogous to the plot 14 shown in FIG. 3. The plot 92 defines a function F1(k) which is described mathematically as follows:

$$F1(k) = \sum_{i=0}^{k} f_i$$

wherein $f_i$ is the compressed size (in bits) of frame i.

The plot 94, F2(k) is described mathematically as follows:

$$F2(k)=F1(k)+B$$

wherein:

B is the size of the playback buffer, the value of which is contained in the buffer size indication message generated by the buffer size indication message generator 62. The buffer size B defines, thereby, the separation distance 96 separating the plots 92 and 94. The bandwidth-smoothing scheme selector 72, shown in FIG. 4, is operable to define a bandwidth plan, indicated by the segments 98, shown in dash, extending between the plots 92 and 94. By selecting the bandwidth allocated to communicate the streaming video to the between the bounds indicated by the plots 92 and 94, assurances are provided that the playback buffer 44 of the mobile station 22 shall not overflow or underflow with streaming video. Because the bandwidth plan selected by the selector 72 takes into account the size of the buffer available at the mobile station to buffer streaming video, the bandwidth plan is better able to efficiently allocate bandwidth to effectuate the communication of the streaming video.

Figure 6:
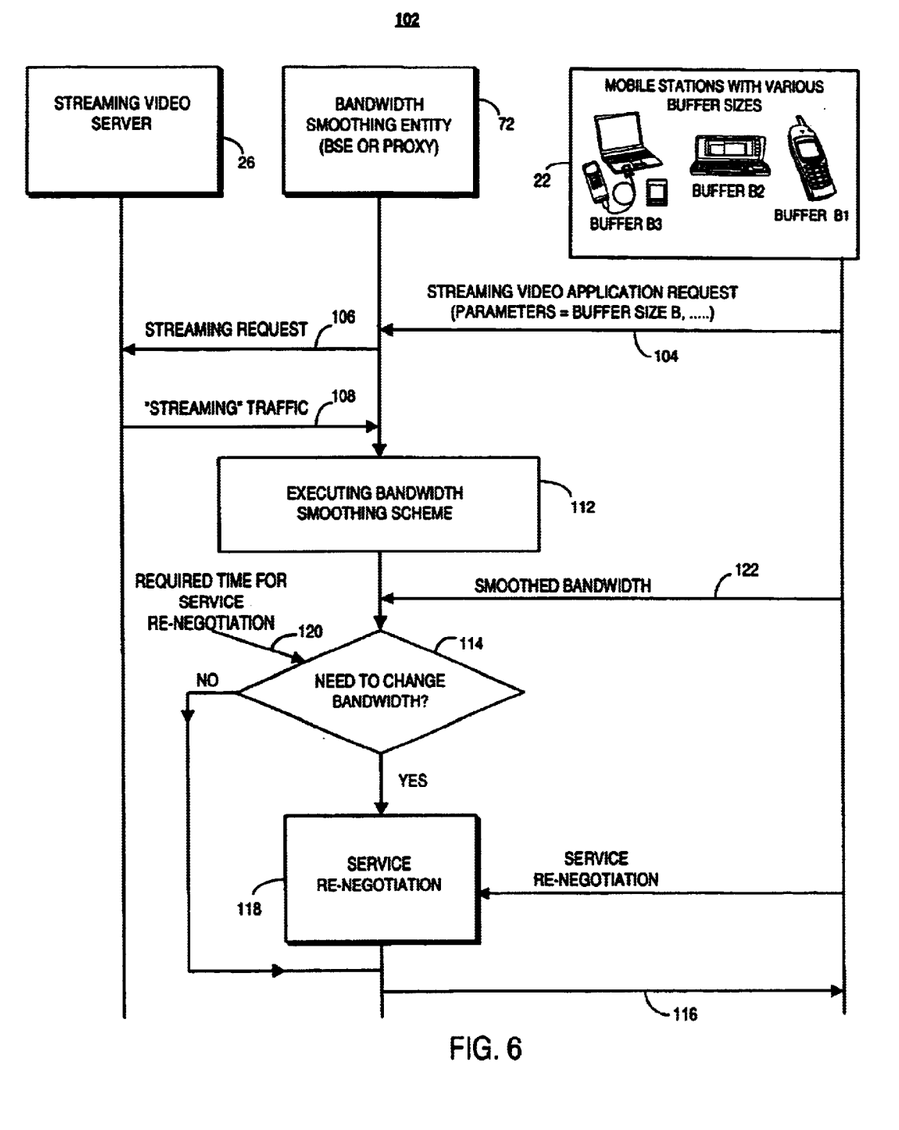
FIG. 6 illustrates a message sequence diagram showing the sequence of messaging during operation of an embodiment of the present invention.

FIG. 6 illustrates a message sequence diagram, shown generally at 102, representing exemplary operation of the communication system 20 shown in FIG. 4. The sequence diagram illustrates the messaging of signals between the streaming proxy, bandwidth-smoothing scheme selector 72, and a mobile station 22 during operation of an embodiment of the present invention. In the exemplary implementation, the mobile station 22 is formed of one of three types of devices, a mobile terminal having a buffer size B1, a personal computer having a buffer size B2, or a mobile terminal coupled together with a personal computer, or the like, having a buffer size B3.

The mobile station initiates operation by generating a request, indicated by the segment 104, for the downloading thereto of streaming video. Together with the request for service, an indication of the buffer size as part of a buffer size indication message is generated. The format of the resultant message is, in the exemplary implementation, similar to the service request message 74, shown in FIG. 4. The request together with the buffer size indication message is communicated over the radio link and through the network infrastructure to be provided to a bandwidth-smoothing scheme selector 72. The selector 72, a functional entity, generates a streaming request, indicated by the segment 106, which is provided to the streaming proxy 26.

Responsive to receipt of the request, an appropriate authentication procedure (not separately shown), streaming video is generated by the streaming proxy and routed to the bandwidth-smoothing scheme selector 72, here indicated by the segment 108.

As indicated by the block 112, the bandwidth-smoothing scheme selector is operable to execute a bandwidth-smoothing scheme and is provided with an indication of the buffer size of the buffer at the mobile station as well as statistics associated with the streaming video to select a bandwidth plan, such as the bandwidth plan indicated by the segments 98 in FIG. 5. Then, and as indicated by the decision block 114, a determination is made as to whether a change in bandwidth allocation is necessitated. If not, the streaming video is routed, indicated by the segment 116, onto the mobile station. Otherwise, if a change in bandwidth is necessitated, service renegotiation is performed, such as by the radio resource manager 84, shown in FIG. 4, to allocate the appropriate amount of bandwidth to effectuate the communication of the streaming video. Performance of the service renegotiation is indicated in the Figure by the service renegotiation block 118. Once the appropriate amount of bandwidth is allocated, the streaming video is routed to the mobile station, again indicated by the segment 116.

In the exemplary implementation, the decision made at the decision block 114 is further predicated upon a time period $T_{req}$, required to perform a service renegotiation. Service renegotiation is performed and subsequent bandwidth reallocation is effectuated only if the required time period during which the bandwidth must be reallocated is greater than the time period required for service renegotiation $T_{req}$. An input into the decision made at the decision block 114 is indicated by the arrow 120. If the time required to perform service renegotiation is greater than, or in one implementation, sufficiently close to, the time period during which the bandwidth is to be changed, a decision is made to forego the service renegotiation. And, the bandwidth remains unaltered.

The sequence diagram representative of operation of the exemplary implementation also shows a buffer full, or empty, message indicated by the segment 122. The buffer full or empty message is generated when the streaming video stored in the fills greater than a selected, e.g., ninety percent, portion of the buffer or fills less than a selected, e.g., twenty percent, portion of the buffer. Such an indication is also used at the decision block 114 in the determination of whether to alter the bandwidth allocated to the communication of the streaming video. The message indicated by the segment 122 is generated anytime the amount of streaming video reaches the selected upper or lower threshold.

In one implementation, the initial bandwidth is selected to be relatively large to fill up the buffer at the mobile station until the buffer reaches an upper threshold, e.g., the aforementioned ninety percent threshold. When filled to such upper threshold, the message indicated by segment 122 is sent. A calculation is then made as to the rate at which the buffer contents are depleted pursuant to decoding etc. operations. And the downloading rate at which the video stream is continued to be communicated to the mobile station is selected responsive to the depletion rate of the buffered data at the buffer. Through such calculations, the amount of service renegotiation signaling can be reduced.

The calculation of the depletion rate is determinable by the formula: (real time to fill the buffer up to the threshold minus time to fill up the buffer if the buffer isn't serviced based on the stated buffer size)/real time to fill the buffer up to the threshold=a maintaining rate (leaking or servicing rate)/higher speed data rate.

Figure 7:
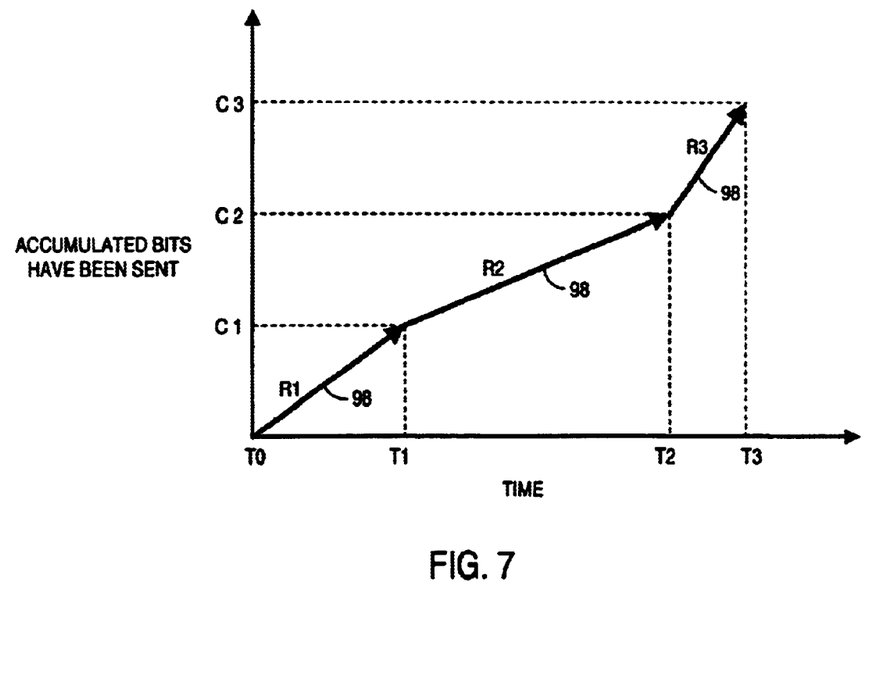
FIG. 7 illustrates a graphical representation illustrating operation of a further embodiment of the present invention by which to selectably request service renegotiation.

FIG. 7 illustrates a graphical representation of a bandwidth plan formed of three segments 98. A first of the segments is referenced by R1; a second of the segments if referenced by R2, and a third of the segments is referenced by the reference R3. R1 refers to the bandwidth required for a time period extending between times T0 and T1. R2 refers to the bandwidth required during the time period extending between the times T1 and T2. And, R3 refers to the bandwidth required during the time period extending between times T2 and T3. In the exemplary implementation, service renegotiations to reallocate bandwidth allocations are made only if the time periods T1–T0, T2–T1, and T3–T2, as appropriate , are greater than $T_{req}$.

If the time period required to renegotiate service to change the bandwidth allocations exceed the time period during which the bandwidth is to be of a changed amount, service renegotiation is not performed. And, the bandwidth allocation is not made. A subsequent determination is made when the bandwidth is to be reallocated at a subsequent time.

Because operation of an embodiment of the present invention takes into account the buffer size available at the mobile station at which to buffer streaming video, improved communication performance in the effectuation of communication of streaming video to the mobile station is possible.

The previous descriptions are of preferred examples for implementing the invention, and the scope of the invention should not necessarily be limited by this description. The scope of the present invention is defined by the following claims.

We claim:

1. In a radio communication system having network infrastructure and having a mobile station at least operable to receive at least one streaming multimedia data component by way of a radio link upon which communication resources are selectably allocated by the network infrastructure, the streaming multimedia data component generated by a streaming multimedia data component source, an improvement of apparatus for the mobile station for facilitating bandwidth-smoothing allocations of bandwidth pursuant to a bandwidth plan to communicate the streaming multimedia data component upon the radio link, said apparatus comprising:

a buffer of a selected buffer size located at the mobile station, said buffer for buffering the streaming multimedia data component when received at the mobile station; and a buffer message generator coupled to receive indications of the selected buffer size of said buffer, said buffer message generator selectably for generating a buffer message for transmission upon the radio link, the buffer message indicating the selected buffer size of said buffer, the buffer message forming part of a request by the mobile station to receive the streaming multimedia data component, the bandwidth plan defining bounds within which the allocations of the bandwidth pursuant to the bandwidth plan are made, the bounds separated by amounts dependent upon the selected buffer size of said buffer, said buffer message generator further selectably for generating a buffer-full message during communication of the streaming multimedia data when the streaming multimedia data component buffered at said buffer exceeds an upper threshold, and said buffer message generator further selectably for generating a buffer-empty message during communication of the streaming multimedia data when the streaming multimedia data component buffered at said buffer falls beneath a selected lower threshold, the buffer-full message and buffer-empty message used to alter the allocations of bandwidth when time required to alter the allocations of the bandwidth is less than a time period during which the allocation of the bandwidth is to be effectuated responsive thereto and the allocations of bandwidth, when altered, selectably causing a service renegotiation at the network infrastructure to reallocate the communication resources upon the radio link.

2. The apparatus of claim 1 wherein said buffer comprises a playback buffer from which the streaming multimedia data component buffered thereat is retrieved to play back the streaming multimedia data component.

3. The apparatus of claim 1 wherein the selected size of said buffer is one of the first size, a second size, and at least a third size and wherein the buffer-size indication message generated by said buffer message generator comprises a value associated with the one of the first size, the second size, and the at least third size.

4. The apparatus of claim 1 wherein the streaming multimedia data component source is identified by an identifier and wherein the request for the streaming multimedia data component further includes an indication of the identifier of the streaming multimedia data component source, the indication of the identifier forming an address by which to route the request together with the buffer-size indication message.

5. In the radio communication system of claim 1 wherein the streaming multimedia data component source is coupled to form a portion of the network infrastructure a further improvement of apparatus for the network infrastructure for facilitating the bandwidth smoothing allocations of bandwidth to communicate the streaming multimedia data component upon the radio link, said apparatus comprising:
a bandwidth smoothing scheme selector coupled to receive indications of the selected buffer size indicated by the buffer message, forming part of the request by the mobile station and generated by said buffer message generator, and to receive indicia of the streaming multimedia data component generated by the streaming multimedia data component source, said bandwidth smoothing scheme selector for defining the bounds within which the allocations of the bandwidth are made and for selecting the allocation of bandwidth for communication pursuant to the bandwidth plan upon the radio link of the streaming multimedia data component responsive to values both of the indications of the selected buffer size and of the indicia of the streaming multimedia data component.

6. The apparatus of claim 5 wherein the indicia of the streaming multimedia data component to which said bandwidth smoothing scheme selector is coupled to receive comprises an indication of a number of bits of which the streaming multimedia data component is formed.

7. The apparatus of claim 5 further comprising a radio resource manager coupled to said bandwidth smoothing scheme selector, said radio resource manager selectably for negotiating for a change in bandwidth allocation upon the radio link if selection by said bandwidth smoothing scheme selector of the allocation of bandwidth necessitates a change in the bandwidth allocation of the radio link.

8. The apparatus of claim 7 wherein negotiations performed by said radio resource manager require at least a minimum negotiation period, the at least the minimum negotiation period related to the time required to alter the allocations of the bandwidth, and wherein said radio resource manager is further coupled to receive indications of the minimum negotiation period, operation of said resource manager further operable responsive to values of the minimum negotiation period.

9. The apparatus of claim 8 wherein said resource manager negotiates for the change in the bandwidth allocation if the selection by said bandwidth smoothing scheme selector necessitates the change in the bandwidth allocation and the indications of the negotiation period are within a selected boundary.

10. The apparatus of claim 7 wherein the network infrastructure includes a radio base station and wherein said bandwidth smoothing scheme selector is located at the streaming multimedia data component source.

11. The apparatus of claim 5 wherein said bandwidth smoothing scheme selector is located at the streaming multimedia data component source.

12. In a radio communication system having network infrastructure and a mobile station, the mobile station at least operable to receive a streaming multimedia data component by way of a radio link upon which communication resources are selectably allocated by the network infrastructure, the streaming multimedia data component generated by a streaming multimedia data component source, an improvement of apparatus for the network infrastructure for facilitating bandwidth-smoothing allocations of bandwidth to communicate the streaming multimedia data component upon the radio link, said apparatus comprising:
a bandwidth-smoothing scheme selector coupled to receive indications of a selected buffer size indicated by a buffer-size indication message as part of a request for the streaming multimedia data component, to receive indicia of the streaming multimedia data component generated by the streaming multimedia data component source, and to receive indications of a time required to implement allocations of bandwidth, said bandwidth smoothing scheme selector for defining the bounds within which the allocations of bandwidth are made and contained in the request for selecting the allocations of bandwidth for communication upon the radio link of the streaming multimedia data component responsive to values of the indications of the selected buffer size and of the indicia of the streaming multimedia data component and initiating implementation of the allocation when the time required to implement the allocations is less than a time period during which the allocations are to be effectuated; and
a radio resource manager coupled to said bandwidth-smoothing scheme selector, said radio resource manager selectably for negotiating for a change in the communication resources upon the radio link responsive to the allocation of the bandwidth selected by said bandwidth-smoothing scheme selector.

13. In a method for communicating in a radio communication system having a mobile station at least operable to receive at least one streaming video by way of a radio link upon which communication resources are selectably allocated by the network infrastructure, the streaming multimedia data component generated by a streaming multimedia data component source, an improvement of a method for facilitating bandwidth to communicate the streaming video upon the radio link, said method comprising:

indicating a buffer-size of a buffer located at the mobile station at which to buffer streaming multimedia data component once received at the mobile station;

generating a buffer indication message at the mobile station, the buffer indication message for transmission upon the radio link, the buffer indication message of a value responsive to the buffer size of the buffer indicated during said operation of indicating;

formatting the buffer indication message as part of a request by the mobile station to receive the streaming multimedia data;

sending the request to the network infrastructure;

allocating bandwidth-smoothed bandwidth pursuant to a bandwidth plan by which to communicate the streaming multimedia data, the bandwidth-smoothed bandwidth defined within bounds, the bounds separated by amounts dependent upon the selected buffer size indicated in the buffer-size indication message;

selectably generating a buffer-full message during communication of the streaming multimedia data when the streaming multimedia data when the streaming multimedia data buffered at the buffer exceeds an upper threshold;

selectably generating a buffer-empty message during communication of the streaming multimedia data when the streaming multimedia data buffered at the buffer falls beneath a lower threshold;

altering the bandwidth-smoothed bandwidth when time required to alter the allocations of the bandwidth is less than a time period during which the allocation of the bandwidth is to be effectuated responsive to any of the buffer-full and buffer-empty messages, respectively; and selectably renegotiating communication resources upon the radio link responsive to any of the buffer-full and buffer-empty messages generated during said operations of selectably generating.

* * * * *